US008270352B2

(12) United States Patent  
Sankar et al.

(10) Patent No.: US 8,270,352 B2  
(45) Date of Patent: Sep. 18, 2012

(54) REDUCTION OF TRANSMISSION OVERHEAD IN A WIRELESS COMMUNICATION SYSTEM

(75) Inventors: Hari Sankar, San Diego, CA (US); Srikanth Gummadi, San Diego, CA (US)

(73) Assignee: Wi-LAN Inc., Ottawa, Ontario (CA)

( * ) Notice: Subject to any disclaimer, the term of this patent is extended or adjusted under 35 U.S.C. 154(b) by 821 days.

(21) Appl. No.: 12/100,339

(22) Filed: Apr. 9, 2008

(65) Prior Publication Data

US 2009/0257406 A1    Oct. 15, 2009

(51) Int. Cl.  
*H04W 4/00* (2009.01)

(52) U.S. Cl. ........................................ 370/329

(58) Field of Classification Search .......... 370/328–339; 455/446, 550.1  
See application file for complete search history.

(56) References Cited

U.S. PATENT DOCUMENTS

| 7,251,291 | B1 | 7/2007 | Dubuc et al. | |
| 7,764,644 | B2* | 7/2010 | Harris et al. | 370/328 |
| 2008/0025337 | A1* | 1/2008 | Smith et al. | 370/439 |
| 2008/0037496 | A1* | 2/2008 | Smith et al. | 370/340 |
| 2008/0228878 | A1* | 9/2008 | Wu et al. | 709/205 |
| 2009/0040970 | A1* | 2/2009 | Ahmadi et al. | 370/329 |
| 2009/0197608 | A1* | 8/2009 | Chin et al. | 455/446 |

* cited by examiner

*Primary Examiner* — Frank Duong  
(74) *Attorney, Agent, or Firm* — Volpe and Koenig, P.C.

(57) ABSTRACT

Methods and apparatuses for reducing the overhead associated with transmitting MAPs are provided by grouping client stations in different constellations into one of two or more groups/allocations based partially upon their respective channel conditions. As a result of grouping, client stations within each group/allocation share a single resource allocation and in addition, the different groups of client stations can be scheduled such that variable modulation repeat-coding schemes can be implemented for map transmissions to each group, thereby reducing the repetition rates and overhead associated with map transmissions.

17 Claims, 10 Drawing Sheets

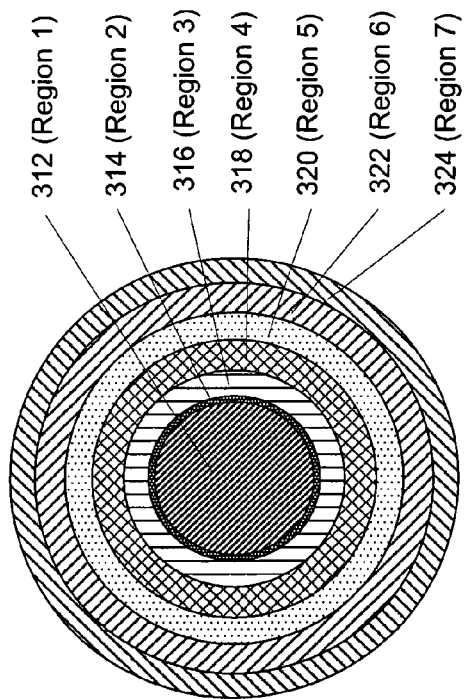
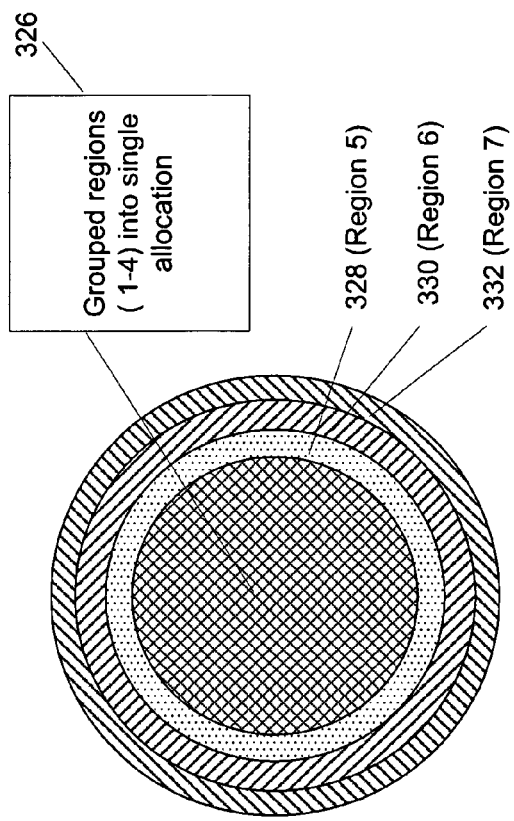
Figure 3a
Figure 3b

REDUCTION OF TRANSMISSION OVERHEAD IN A WIRELESS COMMUNICATION SYSTEM

FIELD OF THE INVENTION

The present disclosure relates generally to the reduction of transmission overhead in a broadband wireless communication system. More particularly, the present disclosure relates to grouping and scheduling of users distributed over a cell, including data as well as voice over Internet Protocol (VoIP) users, so that variable repeat-coding schemes can be implemented for reducing overhead associated with map transmissions.

BACKGROUND OF THE INVENTION

The recent development in wireless multimedia applications has driven increasing demands of high-speed transmission of a large amount of data on radio channels. However, such high-speed data transmission over radio channels can be greatly constrained by high error rate due to multi-path interference. In order to reduce the interference errors, the IEEE 802.16 systems have been developed in which the physical channels of a Wireless Metropolitan Area Network (WMAN) system operate in Orthogonal Frequency Division Multiplexing (OFDM) and Orthogonal Frequency Division Multiple Access (OFDMA). Under these 802.16 systems, high-speed data transmission is realized by transmitting channel signals over a plurality of subcarriers. Also, the OFDM wireless communication system usually supports a frame structure having data bursts of various formats and lengths and these bursts can be efficiently transmitted to users of different Quality of Service (QoS) levels through MAP information. For example, a small-size burst is sufficient for voice or VoIP, while a large-size burst is required for high-speed data blocks. In order to increase flexibility of data allocation, the amount of control information (i.e., overhead) would be increased accordingly, which, however, would use more of the limited resource area to be allocated for actual data. Therefore, there is a need for reducing transmission overhead in a wireless communication system.

SUMMARY OF THE INVENTION

Various embodiments of the present disclosure reduce the overhead associated with transmitting MAP messages by grouping users or client stations in different constellations into one or more groups/allocations for scheduling and resource allocation purposes, and scheduling transmissions for users or client stations in each group such that map messages can be transmitted with variable repeat-coding schemes.

In accordance with one embodiment, repeat by 4 fixed MAP transmission techniques are utilized upon grouping client stations associated with higher constellations into one allocation to save on overhead. In accordance with another embodiment, variable repeat-coding techniques rather than the repeat by 4 fixed techniques are utilized to reduce the overhead associated with repeat-coding of DL- and UL-MAPs for all client stations irrespective of channel condition. In such an embodiment, a different grouping of constellations may be implemented, where at least one region comprised of the different constellations is not necessarily combined into a single allocation.

In one aspect of the present disclosure, a method of reducing overhead comprises assigning a client station to one of at least two constellations; identifying, from a plurality of groups, a group associated with the one of the at least two constellations and assigning the client station to the group, wherein the group is identified based in part upon a modulation and coding scheme supported by the one of the at least two constellations; determining a scheduling scheme associated with the group, wherein the scheduling scheme includes variable repeat-coding schemes for transmitting map messages; and determining, from the scheduling scheme, a particular repeat-coding scheme for transmitting a map message to the group in which the client station is assigned. In one embodiment, each constellation comprises a plurality of client stations in communication with a serving base station under similar channel conditions.

In one embodiment, each group comprises one or more constellations and shares a single resource allocation.

In one embodiment, the scheduling scheme allocates resources for downlink and uplink transmissions with the plurality of groups.

In one embodiment, the step of determining the scheduling scheme further comprises determining a total slot demand for supporting all client stations in one of the plurality of groups. The method may further comprise selecting the scheduling scheme from one or more scheduling schemes if the total slot demand is below a threshold.

In one embodiment, the map message comprises a sub-downlink-uplink-map message.

In another aspect of the present disclosure, a computer program product, embodied on a computer-readable medium, comprises computer code configured to perform the above-described processes.

In another aspect of the present disclosure, a method of reducing overhead associated with map transmissions comprises grouping a plurality of constellations of client stations into one or more groups based in part upon respective channel conditions associated with the constellations, wherein client stations in each group share a single resource allocation for said group; and scheduling and allocating resources for uplink and downlink transmissions with the client stations in each group so that map messages are transmitted to each group with variable repeat-coding schemes.

In one embodiment, the step of grouping is performed based in part upon respective modulating and coding schemes associated with the constellations.

In one embodiment, the step of grouping is performed based in part upon respective signal parameters associated with the constellations.

In one embodiment, the step of scheduling and allocating resources further comprises determining a total slot demand for supporting all client stations in at least one of the groups. The method may further comprise selecting one of at least two scheduling schemes based in part upon the total slot demand, wherein the one of at least two scheduling schemes includes variable repeat-coding schemes for map transmissions.

In another aspect, the present disclosure relates to an apparatus comprising a processor and a memory unit operatively connected to the processor. The memory unit includes computer code configured to assign a client station to one of at least two constellations; computer code configured to identify, from a plurality of groups, a group associated with the one of the at least two constellations and assigning the client station to the group, wherein the group is identified based in part upon a modulation and coding scheme supported by the one of the at least two constellations; computer code configured to determine a scheduling scheme associated with the group, wherein the scheduling scheme includes variable repeat-coding schemes for transmitting map messages; and computer code configured to determine, from the scheduling scheme, a particular repeat-coding scheme for transmitting a map message to the group in which the client station is assigned.

In another aspect of the present disclosure, a scheduler comprises means for grouping a plurality of constellations of client stations into one or more groups based in part upon respective channel conditions associated with the constellations, wherein client stations in each group share a single resource allocation for said group; and means for scheduling and allocating resources for uplink and downlink transmissions with the client stations in each group so that map messages are transmitted to each group with variable repeat-coding schemes.

BRIEF DESCRIPTION OF THE DRAWINGS

FIG. 3a is a diagrammatic representation of pre-grouping zones/regions;

FIG. 3b is a diagrammatic representation of post-grouping zones/regions in accordance with various embodiments;

DETAILED DESCRIPTION OF THE PREFERRED EMBODIMENTS

Various embodiments provide systems and methods for efficient as well as robust communications in a broadband wireless communication network, for example, a mobile WIMAX network. It should be noted, however, that the systems and method described herein for effectuating various embodiments can be applied to many other types of networks. In one embodiment, the systems and methods described herein may reduce the overhead associated with transmitting MAPs by grouping client stations into one of two or more groups and assigning each group to a particular zone or region that is associated with a particular modulation and code repeating scheme. In other words, depending upon various factors, such as where a client station is located relative to a particular cellular tower or base station, such client station can be grouped with like client stations into respective zones or regions. Depending on the zone or region that a client station is grouped and assigned into and other factors such as what type of transmission is made with the client station (e.g., data or VoIP transmission), a scheduler in the base station can schedule transmissions to the client station, which includes, but not limited to, allocating frames for the client station and determining a particular modulation and code rate scheme for transmitting MAP messages to that client station. Because a single type of modulation and code rate scheme rather than a plurality of schemes is being used for the zone or region in which the client station is assigned, the conventional overhead associated with transmitting MAP messages to various client stations under various modulation/code rate schemes can be reduced.

Figure 1:
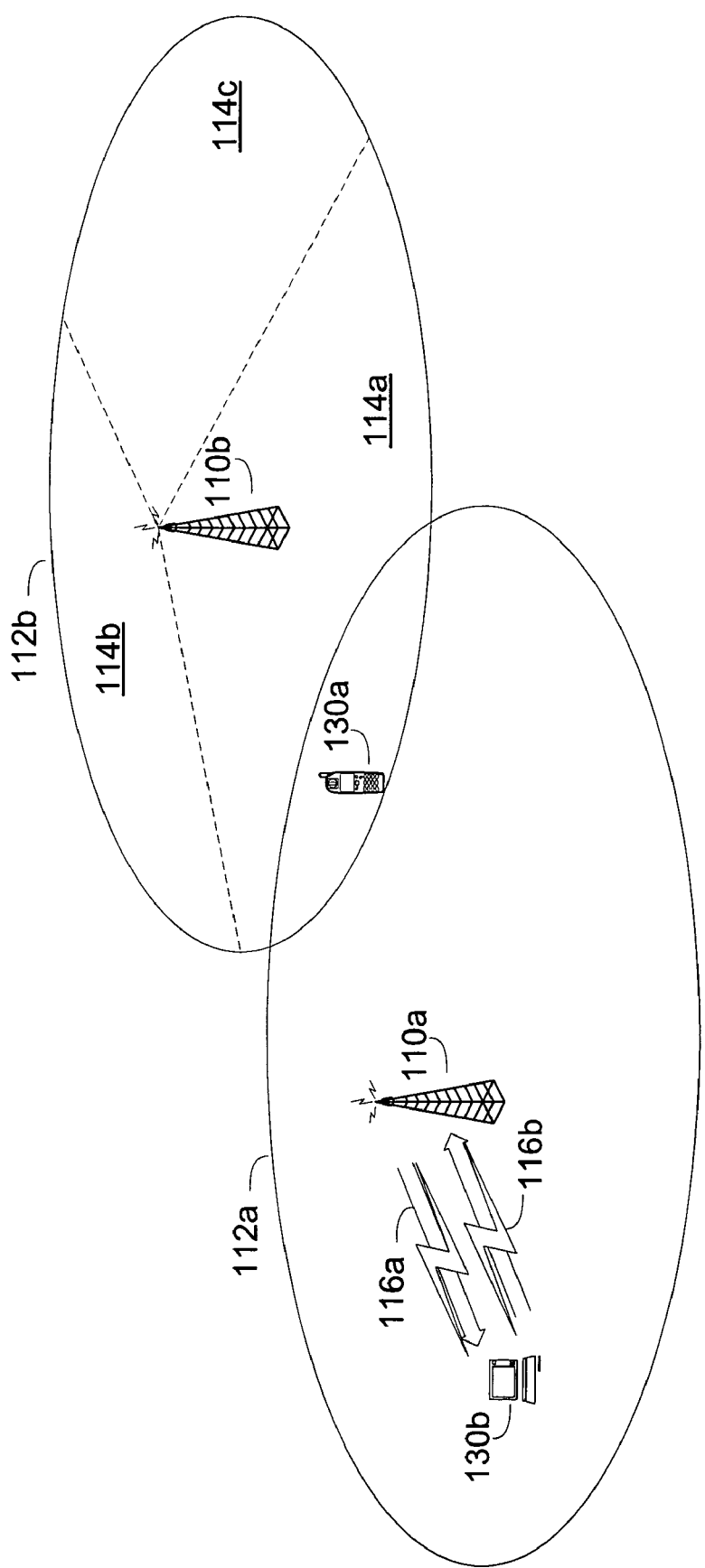
FIG. 1 is a system-level overview diagram of a wireless communication system within which various embodiments can be implemented.

FIG. 1 is a simplified functional block diagram of an embodiment of a wireless communication system 100 in which various embodiments for reducing overhead can be implemented. The wireless communication system 100 includes a plurality of base stations, such as base stations 110a, 110b, each supporting a corresponding service or coverage area 112a, 112b. The base stations are capable of communicating with wireless devices within their coverage areas. For example, the first base station 110a is capable of wirelessly communicating with a first client station 130a and a second client station 130b within the coverage area 112a. Typically, the communications between a base station and a client station are supported by a modulation and/or repeat-coding scheme depending on various factors, such as QoS level of the client station, location or environment in which the client station operates. For example, the first base station 110a can use one type of modulation and repeat-coding scheme in communicating with the client station 130a, while another type of modulation and repeat-coding scheme in communicating with the client station 130b. As shown in FIG. 1, the first client station 130a is also within coverage area 112b and is capable of communicating with the second base station 110b. In this description, the communications path from the base station to the client station is referred to as a downlink 116a and the communications path from the client station to the base station is referred to as an uplink 116b.

Although for simplicity only two base stations are shown in FIG. 1, a typical wireless communication system includes a much larger number of base stations. In a typical system, the base stations 110a and 110b also communicate with each other over a backhaul network (not shown.) The backhaul network may include wired and wireless communications links, as well as supervisory network entities. The base stations 110a and 110b can also be configured as gateways, access points, radio frequency (RF) repeaters, frame repeaters, or nodes and include any wireless network entry point.

The base stations 110a and 110b can be configured to support an omni-directional coverage area or a sectored coverage area. For example, the second base station 110b is depicted as supporting a sectored coverage area 112b. The coverage area 112b is depicted as having three sectors, 114a, 114b, and 114c, each of which can also be referred to as a coverage area. In typical embodiments, the second base station 110b treats each sector, for example sector 114a, as effectively a distinct coverage area.

Although only two client stations 130a and 130b are shown in the wireless communication system 100, typical systems are configured to support a large number of client stations. The client stations 130a and 130b can be mobile, nomadic or stationary units. The client stations 130a and 130b are often referred to as, for example, mobile stations, mobile units, subscriber stations, wireless terminals or the like. A client station can be, for example, a wireless handheld device, a vehicle mounted device, a portable device, client-premise equipment, a fixed-location device, a wireless plug-in accessory or the like. In some cases, a client station can take the form of a handheld computer, a notebook computer, a wireless telephone, a personal digital assistant, a wireless email device, a personal media player, meter-reading equipment or the like.

In one example, the wireless communication system 100 is configured to use Orthogonal Frequency Division Multiple Access (OFDMA) communication techniques. For example, the wireless communication system 100 can be configured to substantially comply with a standard system specification, such as IEEE 802.16 and its progeny or some other wireless standard such as WiBro, WiFi, Long Term Evolution (LTE), or it may be a proprietary system. The ideas described herein are not limited to application to OFDMA systems. The description in the context of an OFDMA system is offered for the purposes of providing a particular example only.

Figure 2:
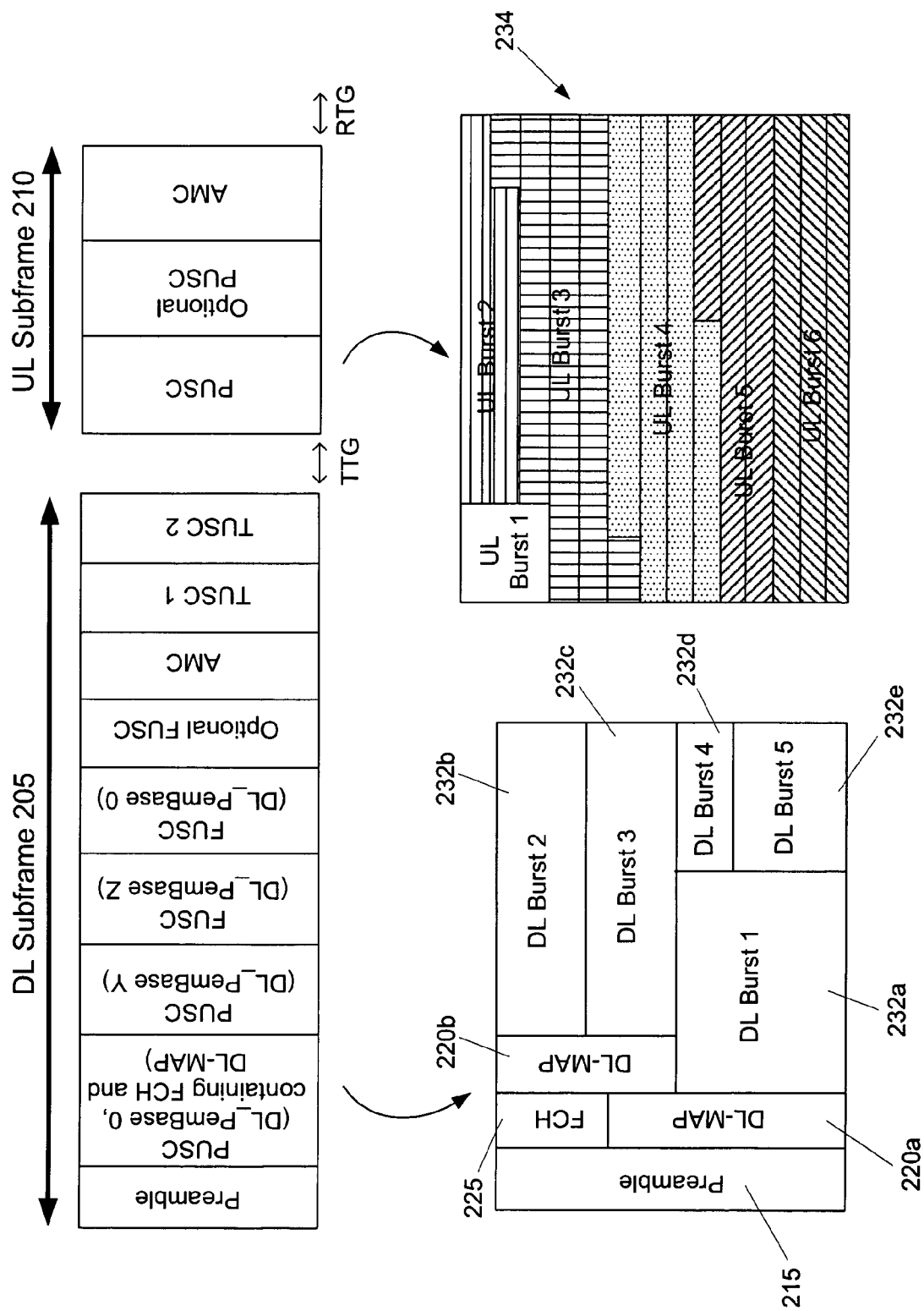
FIG. 2 is a block diagram illustrating the overhead to be reduced in the DL and UL subframes in accordance with various embodiments.

Turning to FIG. 2, in which an exemplary frame structure in an IEEE 802.16 OFDM system is illustrated, the overhead is described below in detail. FIG. 2 shows an OFDM and OFDMA frame 200 operating in the Time Division Duplex (TDD) mode. The physical layer of an OFDMA system can support Time Division Duplex (TDD), as well as Frequency Division Duplex (FDD) and Half-duplexed FDD (H-FDD) modes in which the frame structure is the same. As illustrated in FIG. 2, the frame 200 comprises a downlink (DL) subframe 205 and an uplink (UL) subframe 210. The physical layer of an OFDMA system allows subchannelization in both downlink and uplink. For example, as shown in FIG. 2, the DL subframe can support different subchannelization schemes including, but not limited to, partial usage of subchannels (PUSC), full usage of subchannels (FUSC), advanced modulation and coding (AMC), and tile use of subchannels (TUSC) types 1 and 2. Each of these subchannelization schemes defines a group of subcarriers, whether contiguous or distributed pseudo-randomly, over which a certain portion or zone of the DL subframe is transmitted. Between different portions or zones supporting respective subchannelization schemes, there are zone switch information elements (IE) which are usually embedded in the DL-MAP as described below. FIG. 2 also shows transition gaps (TG), e.g., transmit/receive TG (TTG) and receive/transmit TG (RTG) which separate the DL and UL subframes to prevent downlink and uplink collisions.

In FIG. 2, the DL subframe 205 further comprises a preamble 215 that is used for physical-layer procedures, such as time and frequency synchronization and initial channel estimation. The preamble 215 is followed by a frame control header (FCH) 225 that is formed by a downlink (DL) frame prefix which is repeated appropriately. The FCH 225 provides frame configuration information, such as the MAP message length, modulation and coding scheme, and the usable subcarriers. A MAP message region 220, including a DL-MAP 220*a* and a UL-MAP 220*b*, follows the FCH 225, and following the MAP region 220 in the frame structure are various DL bursts 232*a-e* and UL bursts 234. The MAP messages include the burst profile for each user, which defines the modulation and coding scheme used in that link. Because MAP contains critical information that needs to reach all users, it is often sent over a very reliable link, such as BPSK with rate ½ coding and repetition coding. However, as will be illustrated below, the MAP messages contain allocation information for various connection, which can form a significant overhead, especially when there are a large number of users with small packets (e.g., VoIP) for which allocations need to be specified.

For example, a DL-MAP message can have a structure as shown in Table 1.

TABLE 1

| Syntax | Size | Notes |
|---|---|---|
| DL-MAP_Message_Format( ) { | | |
|     Management Message Type = 2 | 8 bits | |
|     PHY Synchronization Field | variable | See appropriate PHY specification. |
|     DCD Count | 8 bits | |
|     Base Station ID | 48 bits | |
|     Begin PHY Specific Section { | | See applicable PHY section |
|         If (WirelessMAN-OFDMA) { | | |
|             No. OFDMA symbols | 8 bits | Number of OFDMA symbols in DL subframe including all AAS/permutation zone. |
|     } | | |
|     for (i = 1; i< = n; i++) { | | For each DL-MAP element 1 to n. |
|         DL-MAP_IE( ) | variable | See corresponding PHY specification. |
|     } | | |
| } | | |
| if I(byte boundary) { | | |
|     Padding Nibble | 4 bits | Padding to reach byte boundary |
| } | | |
| } | | |

Typically, the above-exemplified DL-MAP message can be transmitted using a modulation scheme QPSK rate of ½ with optional repetition coding of 2, 4 or 6 as required. As shown in the above Table 1, the DL-MAP message contains fixed overhead values including 8 bits of Management Message Type, variable bits (typically 32 bits) of PHY synchronization field, 8 bits of DCD count and 48 bits of Base Station ID. In addition, a Generic MAC Header (GMH) and 32-bit CRC are also transmitted with every DL-MAP message, which further adds a fixed overhead of 48+32 bits. Thus, the overall fixed overhead associated with a DL-MAP is equal to:

$$DL\text{-}MAP_{fixed}=48+32+8+32+8+48+8=184 \text{ bits} \quad (1)$$

Furthermore, the DL sub-frame can include a DL-MAP information element (IE) for which there is an additional overhead for specifying the sub-channel allocation which varies depending on the presence of a connection identifier (CID). For example, if a CID is absent in a non-hybrid automatic repeat request (HARQ) frame, the additional overhead per IE is equal to 36 bits. If the non-HARQ frame contains one or more CIDs, the additional overhead becomes $44+N_{CID} \times R_{CID}$ where $N_{CID}$ is the number of CIDs and $R_{CID}$ is the number of bits required for a CID which is typically 16 bits. For a Hybrid Automatic Repeat Request (HARQ) block, the overhead is $N_{SB} \times (R_{CID}+20)$, where $N_{SB}$ refers to the number of sub-bursts and $R_{CID}$ refers to the number of bits required for CID, which is generally 16 bits. Since DL-MAP with CID occupies a large part of DL-MAP, it can be assumed that when HARQ is absent, no CIDs are utilized thus effectuating savings with regard to overhead, thereby permitting an increase in the capacity of the system. However, substantial overhead remains associated with the DL-MAP message.

With regard to the UL-MAP, it should be noted that the UL-MAP for frame n+1 is transmitted along with the DL-MAP for frame n. Similar to the DL-MAP described above, there is a fixed overhead and a per-CID overhead associated with the transmission of a UL-MAP message. An exemplary UL-MAP structure is illustrated in Table 2 below.

TABLE 2

| Syntax | Size | Notes |
|---|---|---|
| UL-MAP_Message_Format( ) { | | |
|   Management Message Type = 3 | 8 bits | |
|   Reserved | 8 bits | Shall be set to zero. |
|   UCD Count | 8 bits | |
|   Allocation Start Time | 32 bits | |
|   Begin PHY Specific Section { | | See applicable PHY sections. |
|     If (WirelessMAN.OFDMA) { | | |
|       No. OFDMA symbols | 8 bits | Number of OFDMA symbols in the UL subframe |
|     } | | |
|     for (i = 1; i <= n; i++) { | | For each UL-MAP element 1 to n. |
|       UL-MAP_IE( ) | variable | See corresponding PHY specification. |
|     } | | |
|   } | | |
|   if I(byte boundary) { | | |
|     Padding Nibble | 4 bits | Padding to reach byte boundary |
|   } | | |
| } | | |

As shown in the above table, the fixed overhead for the UL-MAP comprises 8 bits of Management Message Type, 8 bits Reserved, 8 bits of UCD Count, 32 bits for Allocation Start Time, and 8 bits for No. OFDMA symbols. Additionally, there is 48 bits of GMH. Therefore, the fixed overhead for the UL-MAP is equal to:

$$UL\text{-}MAP_{fixed} = 48+8+8+8+32+8 = 112 \text{ bits} \qquad (2)$$

Figure 6:
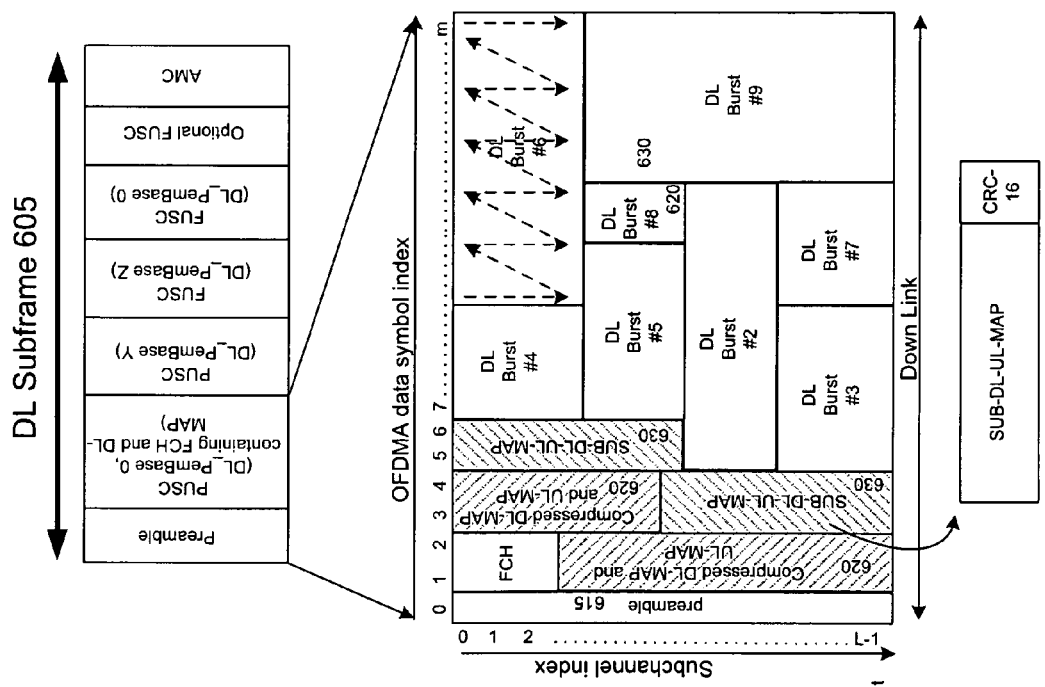
FIG. 6 is a block diagram illustrating the use of sub-DL-UL-MAP in accordance with another embodiment.

It should be noted that there is the option to utilize a compressed MAP (as shown in FIG. 6) in the 802.16e standard which does not utilize the GMH. As a result of using the compressed DL-MAP and UL-MAP, the fixed overhead can be reduced by eliminating the GMH bits, but there still remains a large amount of overhead. To further reduce the overhead, the 802.16 standard also provides use of Sub-DL-UL-MAPs (as shown in FIG. 6) in connection with compressed MAPs. The basic concept of Sub-DL-UL-MAPs is to allow different modulation schemes to be used for the MAP transmission based on the respective channel conditions of the mobile or client stations. As will be described in detail below with reference to FIG. 6, using Sub-DL-UL-MAPs can result in savings in overhead in many scenarios, subject to certain limits specified in the 802.16 standard, for example, there is a limit to three Sub-DL-UL-MAPs per 5 ms frame. In addition, the use of Sub-DL-UL-MAP itself will create additional fixed overhead.

Figure 3C:
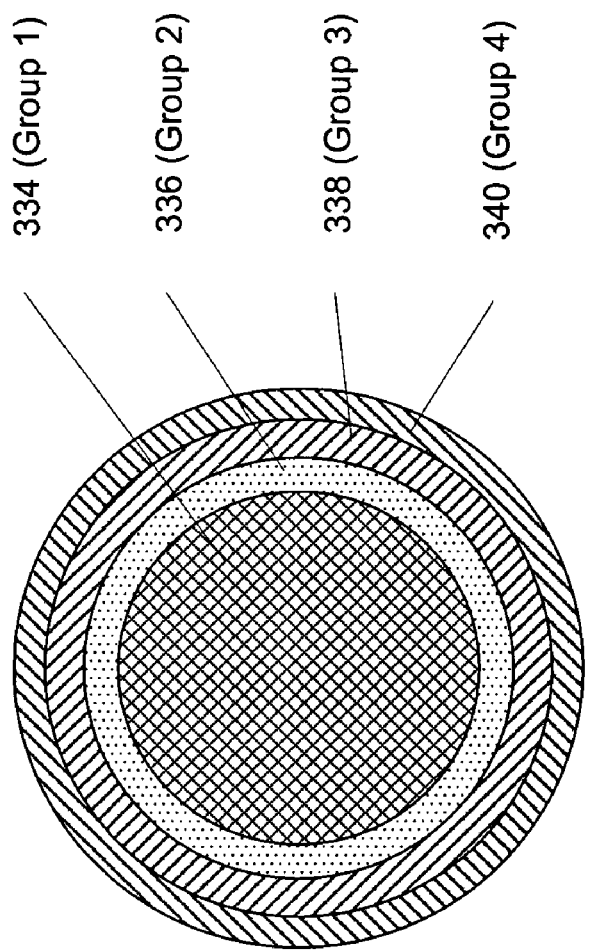
FIG. 3c is a diagrammatic representation of post-grouping zones/regions in accordance with further embodiments.

Referring to FIGS. 3a-c, distribution and grouping of users in different zones or regions based in part upon their respective channel conditions (for example, one measurement parameter can be Signal to Noise Ratios (SNRs)) are described in detail below. As shown back in FIG. 1, a base station supports a coverage area (assumed to be circular) within which multiple subscriber or client stations can communication with the base station. Typically, the client stations are distributed in the coverage area so as to form different sets of constellations. As illustrated in FIG. 3a, each constellation of users or client stations can be, at a high level, abstracted into a uniform and circular region which is at a certain radius distance from the base station in the center (not shown). For example, Region 1-312 is closest to the central base station, while Region 7-324 is the farthest at the cell edge. Between these two regions and in the outward direction are Region 2-314, Region 3-316, Region 4-318, Region 5-320 and Region 6-322. It should be noted that the regions in FIG. 3a are for exemplary purposes only, and in operation, a base station coverage area may include more or fewer constellation regions.

Assuming each constellation of users or client stations utilizes or supports 2×2 MIMO and Convoluntional Turbo Code (CTC) codes, exemplary simulation results including the normal SNRs required for each constellation or region are shown in the Table 3 below:

TABLE 3

| Modulation | TU 30 SNR (dB) | Radius | Area (proportional to) | Region |
|---|---|---|---|---|
| ¾ 64 QAM | 16 | 0.34 | 0.1156 | 1 |
| ⅔ 64 QAM | 14.5 | 0.37 | 0.0213 | 2 |
| ½ 64 QAM | 11 | 0.48 | 0.0935 | 3 |
| ½ 16 QAM | 5.5 | 0.63 | 0.1665 | 4 |
| ½ QPSK | 2 | 0.77 | 0.196 | 5 |
| ½ QPSK rep 2 | −2 | 0.9 | 0.2171 | 6 |
| ½ QPSK rep 4 | −4 | 1 | 0.19 | 7 |

As shown in the above Table 3, based on different nominal SNRs corresponding to respective modulation-code pair configurations, the radii and proportional coverage area can be derived for each constellation or region. As a specific example, the transmission between a base station and a constellation of users or client stations in Region 1 (i.e., region 312 in FIG. 3a) uses a ¾ 64-quadrature amplitude modulation (QAM) modulation rate scheme which is included in a MAP message (as shown in FIG. 2). Although particular modulation/code rate schemes are described above, it should be noted that alternative schemes can be utilized as well as alternative regions utilizing those schemes.

Certain constellations or regions where the modulation coding rate schemes are higher than or at least equal to ½ 16 QAM can be deemed as having good channel conditions. For example, users in Regions 1, 2, 3, 4 have good channel conditions. For these regions or constellations, transmission of DL-MAP and UL-MAP messages using a highly reliable modulation coding scheme, such as ½ QPSK repeated-coded by 4 which can require a typical of 36 bits for DL-MAP transmission, can be superfluous and should be avoided. In one embodiment, these regions (i.e., Regions 1-4 in FIG. 3*a*) can be grouped into one allocation for which a coding repetition of 1 instead of 4 would be sufficient for the MAP transmission, thereby reducing controlling overhead. As shown in FIG. 3*b*, as a result of grouping different constellations, there can be an allocation 326 corresponding to the combined Regions 1-4, an allocation 328 corresponding to Region 5, an allocation 330 corresponding to Region 6 and allocation 332 corresponding to Region 7. Alternatively, the grouping results are presented in FIG. 3*c*, which comprise Group 1-334, Group 2-336, Group 3-338 and Group 4-340. Table 4 below shows exemplary simulation results from grouping different constellations into the above-illustrated four groups:

TABLE 4

| Modulation and Coding Scheme | MCS for MAP Transmission | Rate (bps/Hz) | Area (proportional to) | Group |
|---|---|---|---|---|
| 64 QAM, 16 QAM | ½ QPSK (rep 1) | >=2 | 0.1665 | 1 |
| ½ QPSK | ½ QPSK rep 2 | 1 | 0.196 | 2 |
| ½ QPSK rep 2 | ½ QPSK rep 4 | 0.5 | 0.2171 | 3 |
| ½ QPSK rep 4, ⅓ QPSK rep 4 | QPSK rep 4 | <=0.25 | 0.19 | 4 |

As shown in the above Table 4, users or client stations in Group 1 can support transmissions with the base station using modulation coding schemes ranging from 64 QAM to 16 QAM, and the MAP message can be transmitted using a single or identical modulation repeat-coding scheme, e.g., ½ QPSK with repetition of 1. Users or client stations in Group 2 can support transmissions with the base station using a modulation coding schemes of ½ QPSK with repetition of 1, and the MAP message can be transmitted using a modulation repeat-coding scheme of ½ QPSK with repetition of 2. Users or client stations in Group 3 can support transmissions with the base station using a modulation coding schemes of ½ QPSK with repetition of 2, and the MAP message can be transmitted using a modulation repeat-coding scheme of ½ QPSK with repetition of 4. Users or client stations in Group 4 can support transmissions with the base station using a modulation coding schemes of ½ QPSK with repetition of 4 or even lesser, and the MAP message can be transmitted using a modulation repeat-coding scheme of QPSK with repetition of 4. In addition, the VoIP users in Group 4 can also support ⅓ QPSK repeated by 4 through Hybrid Automatic Repeat reQuest (H-ARQ), as will be described in detail below.

Figure 4:
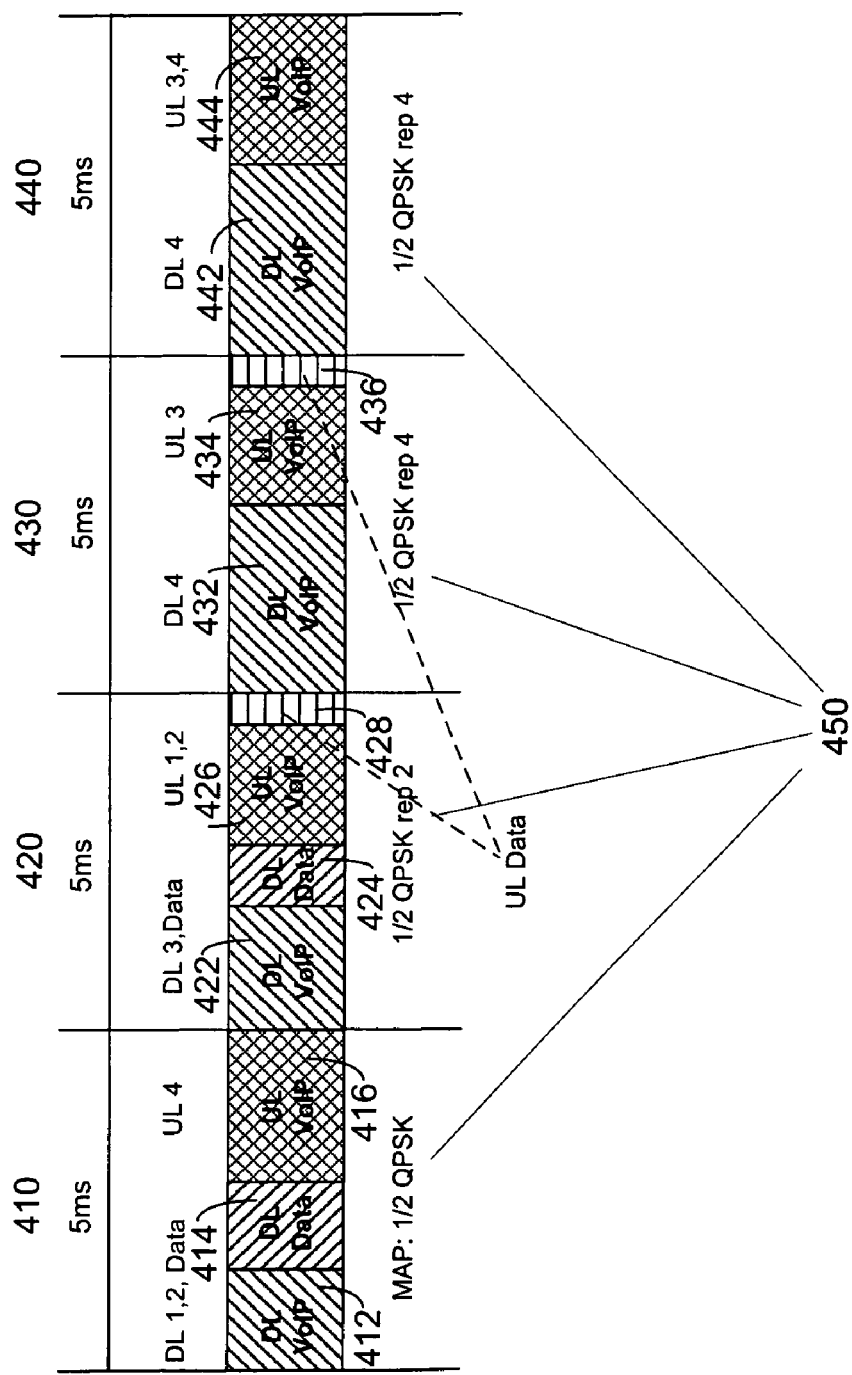
FIG. 4 is an illustration of a schedule grouping in accordance with a first allocation strategy in accordance with one embodiment.
Figure 5:
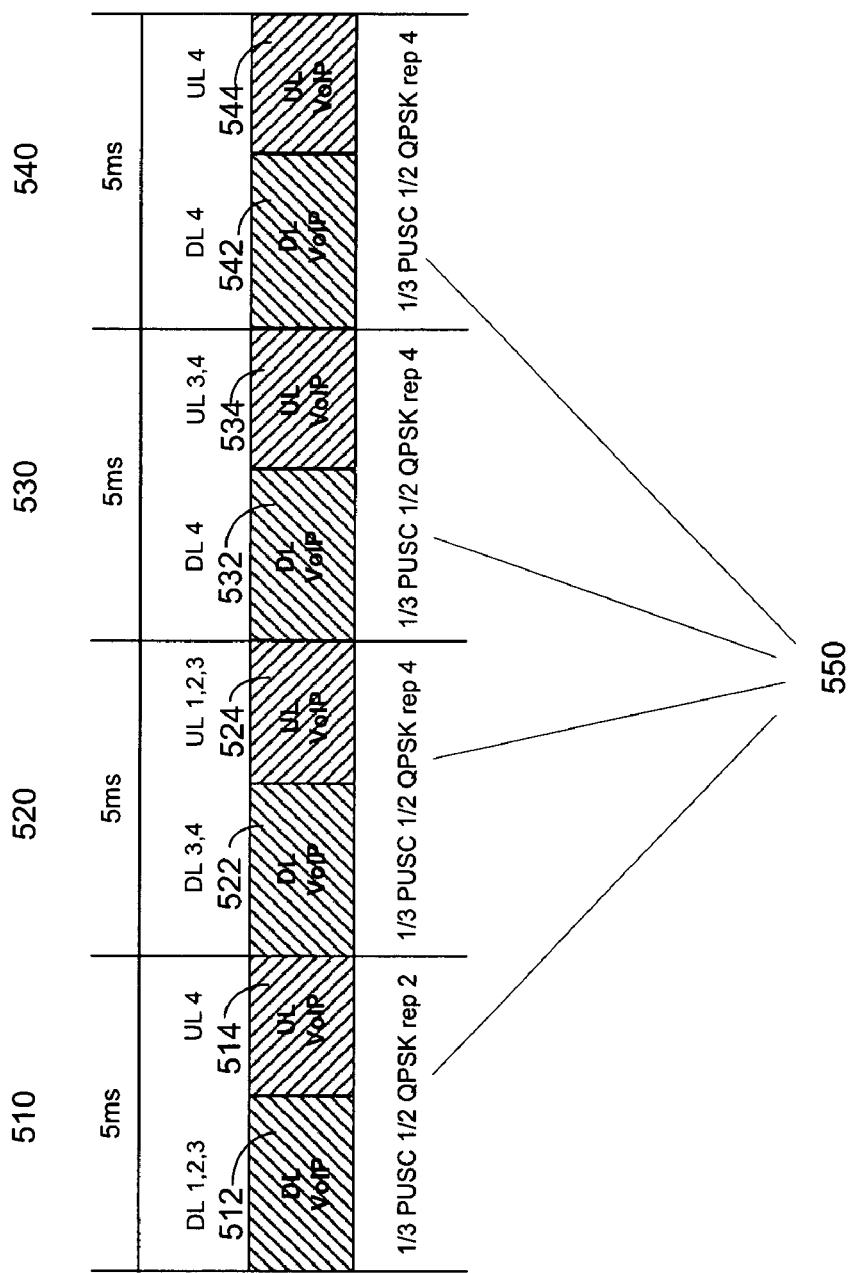
FIG. 5 is an illustration of a schedule grouping in accordance with a second allocation strategy in accordance with another embodiment.

In one implementation embodiment, in order to reduce the overhead associated the MAP transmission, the client stations in different groups need to be scheduled optimally to avoid repetitive coding for transmitting MAPs over certain frames. FIGS. 4 and 5 illustrate two exemplary scheduling strategies in accordance with various embodiments. For purposes of examples only, the description below referring to FIGS. 4 and 5 is based on the following assumptions: (1) among all client stations or users in communication with the base station, there are a fixed number of users communicating with short packets (e.g., 180-220 bits per packet depending on length of headers, similar to VoIP packets) and these users are distributed uniformly along the circular cell, as shown as Regions 1-7 in FIG. 3*a* or Groups 1-4 in FIG. 3*c*; (2) there are a small number of large-packet users or client stations (e.g., 4800 bits per packet) distributed in certain areas depending on the SNRs and the transmission with those users may use a low-rate modulation scheme, such as ⅓ QPSK, with a very low coding repetition rate or even through re-transmissions; (3) there are also a small number of small packet users or client stations at the edge of the cell, such as Region 7 in FIG. 3*a* or Group 4 in FIG. 3*c*, which need to be reached using a very low-rate coding scheme, such as ⅓ QPSK repeated by 4 through H-ARQ; and (4) in addition, there are a small number of large-packet users at the edge of the cell that need to be reached with a very low-rate coding scheme such as ⅓ QPSK repeated by 4 through H-ARQ. It is also assumed that in each 5 ms frame (.apprxeq.500 slots) there are the following parameters and values as in Table 5, such as a control overhead (e.g., preamble) of 4 OFDM symbols, a zone-switch IE of 40 bits and so forth. It should be understood that implementation of various embodiments of the present disclosure is not limited to the above-listed assumptions, but may be tailored to specific system needs.

TABLE 5

| Parameter | Value |
|---|---|
| Compressed Dlmapfixed | 88 bits |
| Compressed Ulmapfixed | 48 bits |
| DL-MAP IE (no CID) | 36 bits |
| UL-MAP IE | 32 bits |
| Zone-Switch IE (STC_DL_Zone_IE) | 40 bits |
| HARQ RCID | 36 bits |
| Raw VoIP packet | 172 bits |
| VoIP Header | 1 to 6 bytes |
| Header Compression (RoHC) | 0.9 |
| Voice Activity | 0.5 |
| FCH | 4 slots |
| DL OFDM Symbols (in 5 ms) | 33 |
| UL OFDM Symbols (in 5 ms) | 14 |
| Total User-Traffic symbols | 47 |
| Overhead Control (in 5 ms) | 4 out of 47 |

FIG. 4 illustrates an exemplary scheduling scheme 400 over four frames, namely, frames 410, 420, 430 and 440, for transmissions to users or client stations in Groups 1-4 as shown in FIG. 3*c*. As seen in FIG. 4, the transmissions over the frames include transmitting data as well as VoIP to different users or client stations in both downlink and uplink directions, and in particular, the MAP transmissions in each frame are supported by different modulation code rate schemes 450. Specifically, under the illustrated scheduling scheme 400, frame 410 is scheduled to support users or client stations in Groups 1 and 2 in the downlink, and Group 4 in the uplink. According to this scheduling scheme, a first portion of the frame 410 is allocated for DL VoIP 412, a second portion for DL data 414, and a third portion for UL VoIP 416. In other words, over the frame 410, users or client stations in Groups 1 and 2 receive VoIP as well as data transmission from the serving base station in the downlink, while users or client stations in Group 4 conduct uplink transmission of VoIP with the base station. Similarly, under the scheduling scheme 400, frame 420 is used to support users or client stations in the Group 3 in the downlink direction and Groups 1 and 2 in the uplink direction. Specifically, frame 420 is allocated such that a first portion DL VoIP 422 and a second portion DL Data 424 are reserved for transmitting VoIP as well as data to users or client stations in Group 3, while a third portion UL VoIP 426 and a fourth portion UL Data 428 are for uplink transmission by the users or client stations in the Groups 1 and 2. Frame 430 is allocated such that a first portion DL VoIP 432 is used for transmitting VoIP in the downlink to users or client stations in Group 4, while a second portion UL VoIP 434 and a third portion DL Data 436 are used for transmitting VoIP as well as data in the uplink for users or client stations in Group 3. Frame 440 is allocated such that a first portion DL VoIP 442 is used for transmitting VoIP in the downlink for users or client stations in Group 4, while a second portion UL VoIP 444 is used for uplink transmissions for users or client stations in Groups 3 and 4. Additionally, FIG. 4 shows (at 450) the various modulation coding repetitions associated with the transmission of MAP messages within each frame. For example, the MAP transmission in frame 410 supports a modulation coding scheme ½ QPSK with repetition of 1, the MAP transmission in frame 420 supports a modulation coding scheme ½ QPSK with repetition of 2, and the MAP transmissions in frames 430 and 440 support a modulation coding scheme ½ QPSK with repetition of 4. That is, under the exemplary scheduling method illustrated in FIG. 4 and described above, over the frame 410, repetition of 1 instead of 2 or more is sufficient for MAP message coding and transmission. As a result, the overhead associated with MAP transmissions can be reduced substantially.

It should be noted that the exemplary scheduling scheme 400 illustrated in FIG. 4 is also based on the assumption that the time boundary between downlink and uplink is fixed without variations from frame to frame and further reduction in overhead may result with the changes in the time boundary.

The exemplary scheduling scheme in FIG. 4 is designed, in a large part, to accommodate the different number of slots required by users or client stations in different groups with the maximum number of slots required by users in Group 4. In operation or as shown in simulation results, the scheme in FIG. 4 works effectively when the total number of slots required or demanded by users or client stations in Group 4 is below 500 slots (i.e., less than a 5 ms frame). If the total number of slots required for Group 4 exceed 500, more than two 5 ms frames are needed to fully support transmissions of data traffic as well as overhead (including MAP) to the users or client stations in that group. In this case, an alternative exemplary scheduling scheme as illustrated in FIG. 5 is proved more effective for accommodating all users or client stations in Group 4. As shown in FIG. 5, there are four exemplary 5 ms frames 510, 520, 530 and 540 over which the serving base station transmits with the users or client stations in the Groups 1-4 as shown in FIG. 3c. Specifically, frame 510 comprising a portion for DL VoIP 512 and a portion for UL VoIP 514 is allocated for users or client stations in Groups 1, 2 and 3 in the downlink and Group 4 in the uplink. Frame 520 comprising a portion for DL VoIP 522 and a portion for UL VoIP 524 is allocated for users or client stations in Groups 3 and 4 in the downlink and Groups 1, 2, and 3 in the uplink. Frame 530 comprising a portion for DL VoIP 532 and a portion for UL VoIP 534 is allocated for users or client stations in Group 4 in the downlink and Groups 3 and 4 in the uplink. Frame 540 comprising a portion for DL VoIP 542 and a portion for UL VoIP 544 is allocated for users or client stations in Groups 4 in both downlink and uplink connections. In addition, the modulation repeat-coding schemes 550 for MAP transmission in each frame are varied from ⅓ PUSC ½ QPSK with a repetition of 2 to ⅓ PUSC ½ QPSK with a repetition of 4.

It should be noted that the scheduling schemes in FIGS. 4 and 5 are for illustration purpose only, and alternative zones, distributions, combinations, and modulation/coding rate schemes can be utilized in accordance with various embodiments and actual system requirements.

Another technique to further reduce overhead is to utilize sub-DL-UL-MAPs in connection with the grouping techniques and scheduling schemes as described above, although it should be noted that various embodiments are not dependent upon the use of sub-DL-UL-MAPs. Sub-DL-UL-MAPs allow a different modulation/constellation to be used for the MAP transmission depending on the channel conditions of the client station. The structure of the sub-DL-UL-MAP is shown in FIG. 6. As before, a DL subframe 605 is illustrated, comprising a preamble 615, an FCH 625, and compressed DL-MAP and UL-MAP 620. Additionally, a sub-DL-UL-MAP 630 is also presented. As provided in the 802.16 standard, there are some limits to the use and format of the sub-DL-UL-MAP. For example, the sub-DL-UL-MAP includes a cyclical redundancy code (CRC) and is specified by a SUB-MAP pointer IE in the compressed DL-MAP. In addition, there is a limit of three sub-DL-UL-MAPs per 5 ms frame according to the standard. The use of sub-DL-UL-MAPs creates additional fixed overhead, but overall, it results in reduction in overhead in most scenarios, especially for the exemplary scheme presented in FIG. 4 where MAP is transmitted using ½ QPSK code repeated by 4.

Figure 7:
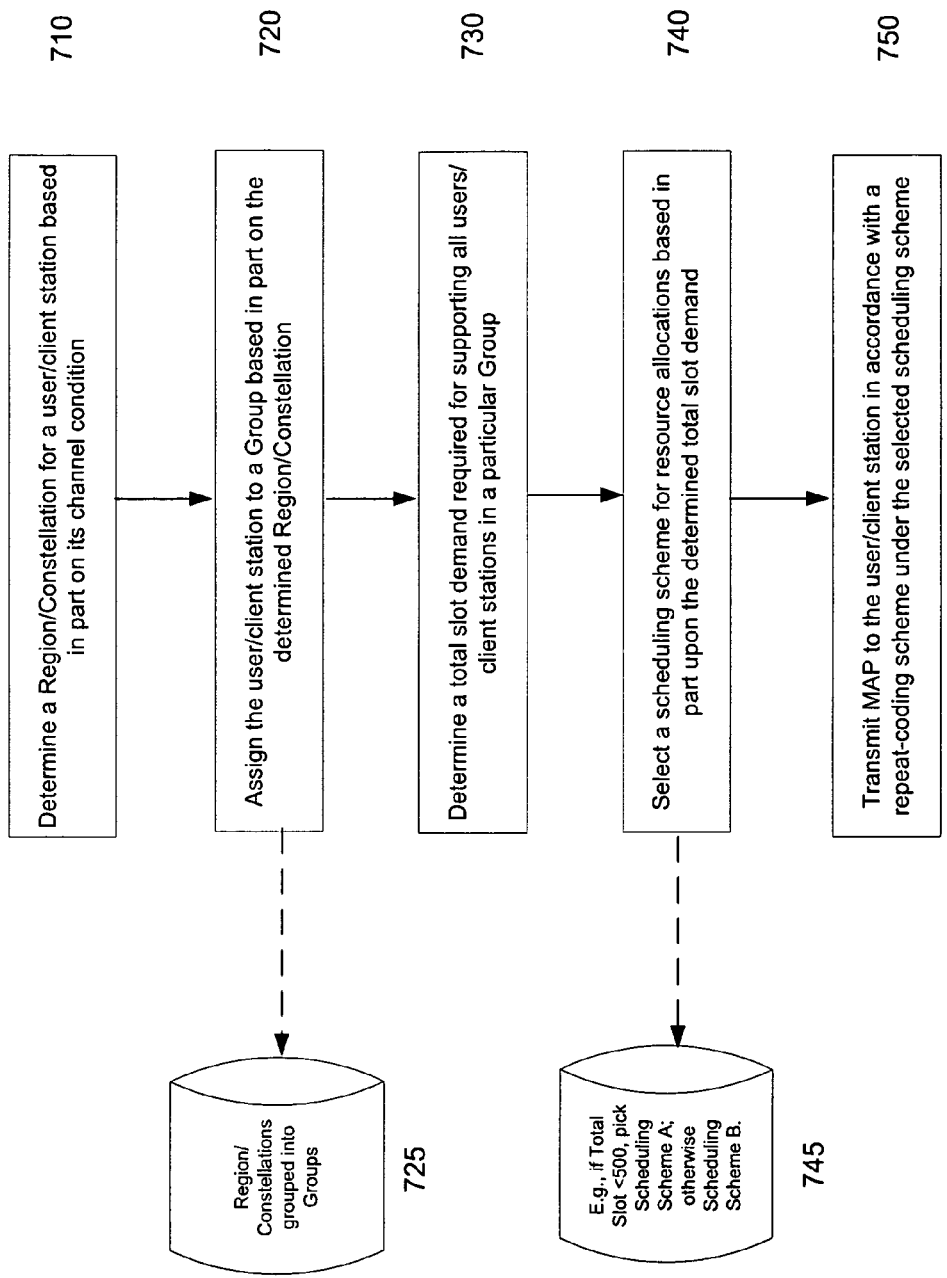
FIG. 7 is a flowchart illustrating scheduling processes performed in accordance with various embodiments.

FIG. 7 is a flow chart illustrating exemplary processes for grouping and scheduling users or client stations in different regions in accordance with various embodiments described herein. In FIG. 7, the process 700 starts at step 710 at which the serving base station first determines in which region or constellation a user or client station is located. In operation, such determination can be made through the channel conditions associated with the client station, for example, signals received from the client station and the signal metric values detected therein. At step 720, the client station will be assigned to a Group (as illustrated in FIG. 3c) based in part upon the constellation or region determined at the previous step. In assigning the client station, the serving base station can refer to a region-group table 725 that is generated in accordance with methods or procedures described herein. For example, if the client station is determined to fall in Region 1 in FIG. 3a, it will be assigned to Group 1 in FIG. 3c. Or if the client station falls within Region 7 in FIG. 3a, it should be assigned to Group 4 in FIG. 3c. Then the process 700 proceeds to step 730 at which a total slot demand is determined for supporting all users or client stations in a particular Group, for example, Group 4 as described above. At step 740, the serving base station, or more specifically a scheduler therein, would select a scheduling scheme based in part upon the total slot demand in that particular group. In operation, the selection can be made by referring to a scheduling scheme database 745 that contains different scheduling schemes designed to accommodate total slot demands. As an example, if the total slot demand exceeds 500, a scheduling scheme as illustrated in FIG. 5 can be selected for allocating resources over various frames so as to reduce overhead in transmitting with the client stations within the coverage. After the scheduling scheme is selected and resource allocation over various frames is determined, at step 750 the serving base station can transmit MAP messages using various modulation coding schemes, some of which can be repeat coded by 1 instead of 2 or 4, thereby reducing transmission overhead. It should be understood the variations or combinations of the above-exemplified steps may be performed in implementing the various embodiments described herein, and the flow chart in FIG. 7 is for example only.

Figure 8:
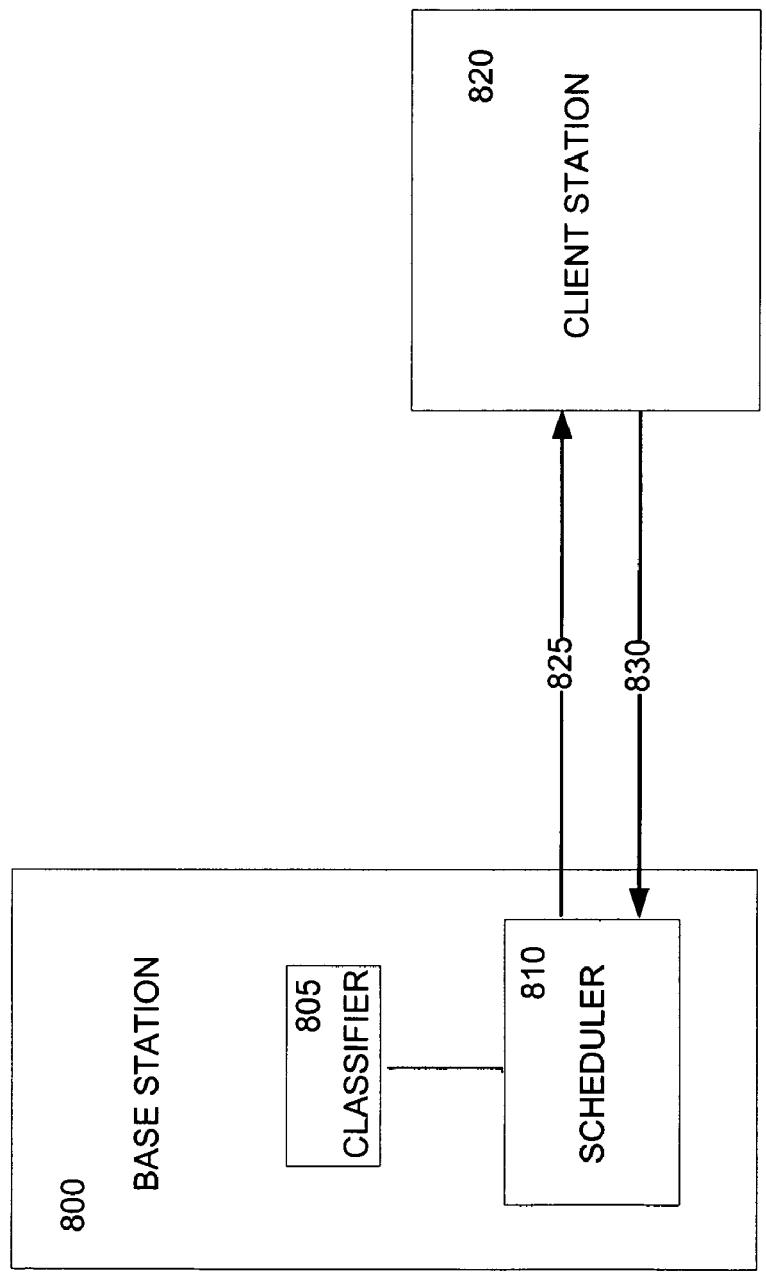
FIG. 8 is a block diagram illustrating a base station in which a scheduler performing processes in accordance with various embodiments can be implemented.

FIG. 8 illustrates an exemplary, simplified block diagram of a base station 800 according to an embodiment in communication with a client station 820. The base station 800 includes a classifier 805 and a scheduler 810, where the scheduler 810 performs the processes described herein for reducing overhead by, e.g., grouping of client stations in different constellations or regions into a single allocation. Additionally, the base station 800 can include one or more antennas/transmitters (not shown) adapted to receive and transmit signals for communication with the client station 820, where the antenna(s)/transmitter(s) of the base station 800 may be tuned for communication at one or more ranges of frequencies. The antenna(s)/transmitter(s) may also be coupled directly or indirectly, to various other elements, such as a radio interface module, a signal processor module, and a controller module. Connections 825 and 830 between the base station 800 and client station 820 can be MAC connections comprising downlink and uplink transmissions, respectively.

Figure 9:
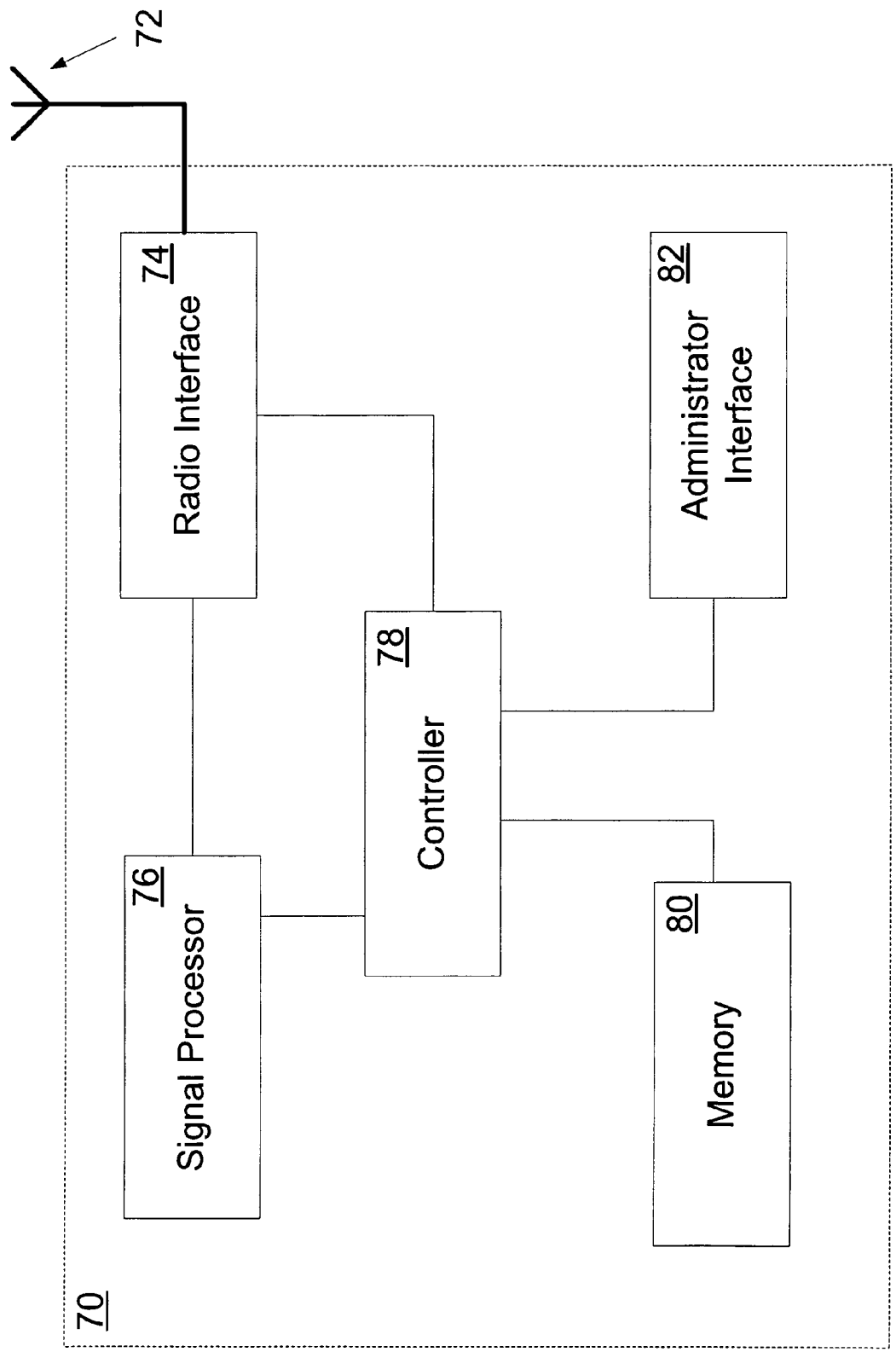
FIG. 9 is a schematic representation of a base station.

FIG. 9 illustrates an exemplary, simplified block diagram of a base station 70 according to an embodiment of the present disclosure. The base station 70 includes an antenna 72 adapted to receive uplink 116*b* signaling and transmit downlink 116*a* signaling for communication with a client station. The antenna 72 and radio interface module 74 of the base station 70 may be tuned for communication at one or more ranges of frequencies.

A processing module 76 is coupled to the radio interface module 74. The processing module 76 can determine the allocation units which are assigned to a particular client station for use on the uplink. The processing module 76 creates a grant message for transmission to the client station indicating the assigned allocation units. In one embodiment of the present disclosure, the processing module 76 grants allocation units to a client station which consist substantially of mirror image pairs of subcarriers. In addition, the processing module 76 may grant allocation units to one or more client stations which consist substantially of subcarriers whose mirror image subcarriers are not assigned to any client station.

In one embodiment, the processing module 76 determines the allocation units to be used by the base station 70 to transmit information from the base station 70 to the client station. The processing module 76 may use allocation units which consist substantially of mirror image pairs of subcarriers. In one embodiment, the processing module 76 uses allocation units which consist substantially of subcarriers whose mirror image subcarriers are not assigned to any client station.

A signal processor module 76 may be coupled to the radio interface module 74 to aid in the processing of signals received from client stations or to be transmitted to the client stations. In this regard, the signal processor module 76 may be adapted to code or decode communication signals.

The signal processor module 76 and the radio interface module 74 may be coupled to a controller module 78 adapted to control the operation of the base station 70. In this regard, the controller module 78 may be a central processing unit. A memory module 80 may be provided to store data and programs to be accessed by the controller 78. In order to facilitate maintenance, repair or upgrading of the base station 70 and its various modules, an administrator interface 82 may be provided. The administrator interface 82 may include a keyboard or other input device. The administrator interface 82 may also include an output device, such as a monitor or a printer, to facilitate diagnostic operations.

Various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of various embodiments have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of reducing overhead, the method comprising:
assigning, by a base station, a client station of a plurality of client stations to one of at least two groups based on a modulation and coding scheme associated with the client station, wherein each of the at least two groups is associated with a respective at least one modulation and coding scheme distinct from each of the at least one modulation and coding scheme associated with each of the other at least two groups; and
transmitting, by the base station, to client stations associated with each of the at least two groups, allocation information associated with each of the at least two groups using a distinct modulation and coding scheme for each of the at least two groups, respectively.

2. The method of claim 1, wherein each of the at least two groups comprises a plurality of client stations in communication with the base station under similar channel conditions.

3. The method of claim 1, wherein the client stations associated with each of the at least two groups share a single resource allocation.

4. The method of claim 1, further comprising allocating resources for downlink and uplink transmissions with the client stations associated with each of the at least two groups.

5. The method of claim 1, further comprising determining a total slot demand for supporting one or more of the client stations associated with each of the at least two groups.

6. The method of claim 1, wherein the allocation information comprises a sub-downlink-uplink-map message.

7. The method of claim 1, wherein a coding repetition for a repeat-coding scheme is selected for each of the at least two groups based on the at least one modulation and coding scheme associated with each of the at least two groups.

8. The method of claim 7, further comprising:
transmitting, to the client stations associated with each of the at least two groups, at least a portion of the allocation information a predetermined number of times based on the repeat-coding scheme.

9. A method of reducing overhead, the method comprising:
grouping, by a base station, a plurality of client stations into one or more groups based on a modulation and coding scheme associated with each of the plurality of client stations, wherein client stations associated with each of the one or more groups are associated with a modulation and coding scheme distinct from each of the at least one modulation and coding schemes associated with each of the other of the one or more groups; and
scheduling and allocating resources, by the base station, for uplink and downlink transmissions with the plurality of client stations associated with each of the one or more groups so that allocation information is transmitted using a distinct modulation and coding scheme for each of the one or more groups, respectively.

10. The method of claim 9, wherein the scheduling and allocating resources further comprises determining a total slot demand for supporting all client stations in at least one of the one or more groups.

11. The method of claim 10, wherein the scheduling and allocating resources further comprises selecting one of at least two scheduling schemes based in part upon the total slot demand, wherein the one of at least two scheduling schemes includes variable repeat-coding schemes for allocation information transmissions.

12. A non-transitory machine-readable storage medium storing a set of instructions for execution by one or more processors for reducing overhead, the set of instructions, when executed by the one or more processors, performs a method comprising:
assigning, by a base station, a client station of a plurality of client stations to one of at least two groups based on a modulation and coding scheme associated with the client station, wherein each of the at least two groups is associated with a respective at least one modulation and coding scheme distinct from each of the at least one modulation and coding scheme associated with each of the other at least two groups; and
transmitting, by the base station, to client stations associated with each of the at least two groups, allocation information associated with each of the at least two groups using a distinct modulation and coding scheme for each of the at least two groups, respectively.

13. The non-transitory machine-readable storage medium of claim 12, wherein each of the at least two groups comprises a plurality of client stations in communication with the base station under similar channel conditions.

14. The non-transitory machine-readable storage medium of claim 12, wherein the client stations associated with each of the at least two groups share a single resource allocation.

15. The non-transitory machine-readable storage medium of claim 12, wherein the set of instructions, when executed by the one or more processors, performs the method further comprising allocating resources for downlink and uplink transmissions with the client stations associated with each of the at least two groups.

16. The non-transitory machine-readable storage medium of claim 12, wherein the set of instructions, when executed by the one or more processors, performs the method further comprising determining a total slot demand for supporting all client stations in one of the at least two groups.

17. The non-transitory machine-readable storage medium of claim 12, wherein the allocation information comprises a sub-downlink-uplink-map message.

* * * * *